Nov. 28, 1950 W. R. KOCH 2,531,691

SYNCHRONIZING SYSTEM

Filed May 31, 1946 2 Sheets-Sheet 1

INVENTOR
Winfield R. Koch
BY
H. S. Grover.
ATTORNEY

Nov. 28, 1950 W. R. KOCH 2,531,691

SYNCHRONIZING SYSTEM

Filed May 31, 1946 2 Sheets-Sheet 2

INVENTOR
Winfield R. Koch
BY H. S. Grover.
ATTORNEY

Patented Nov. 28, 1950 2,531,691

UNITED STATES PATENT OFFICE 2,531,691

SYNCHRONIZING SYSTEM

Winfield R. Koch, Haddonfield, N. J., assignor to Radio Corporation of America, a corporation of Delaware Application May 31, 1946, Serial No. 673,293

1 Claim. (Cl. 178—69.5)

The present invention relates to facsimile signalling systems, and more particularly, but not necessarily exclusively, to a signal receiving and recording system for minimizing the effects of selective fading on the sync signal which is part of a facsimile signal transmitted by radio as a modulation of a radio carrier frequency.

This invention is directed primarily to providing means for assuring that the sync signal for controlling the operation of a facsimile recorder is present at all times irrespective of selective fading conditions. Selective fading appears to follow a definite characteristic. Portions of the transmitted signal spectrum 2500 cycles apart are almost completely attenuated under typical conditions in the presently assigned broadcast frequencies of 500—1500 kc. whereas frequencies lying between these attenuated signals are received at times with greater than the normal or average strength. These regions of attenuation and normal or better than average transmission levels shift with the change in fading conditions and may not be offset merely by locating the desired signal components at a definite point in the frequency spectrum. In accordance with this invention the components of a desired signal are confined to a band which is less than the frequency difference between points of maximum attenuation so that only one part of the band can be attenuated at one time by the generally prevailing fading conditions mentioned above.

Accordingly, the primary object of the invention is to substantially eliminate or minimize the effects of fading of transmitted signal components by confining these components to a band width narrower than the frequency difference between points where the direct and reflected waves cancel each other.

Another object of the invention is to provide a novel receiver for recovering all or an essential part of signals transmitted in a relatively narrow frequency band with respect to points of maximum attenuation by fading.

Another object of the invention is to provide for a novel arrangement of several side frequencies or side-bands in a facsimile signal transmitted by radio.

Other objects of the invention will become apparent when the following specification and claim are read in connection with the accompanying drawings wherein:

Fig. 1 of the drawings is an amplitude vs. frequency curve representing selective fading of radio signals where the reflected wave has the same intensity as the direct wave;

Figures 1, 2, 3:
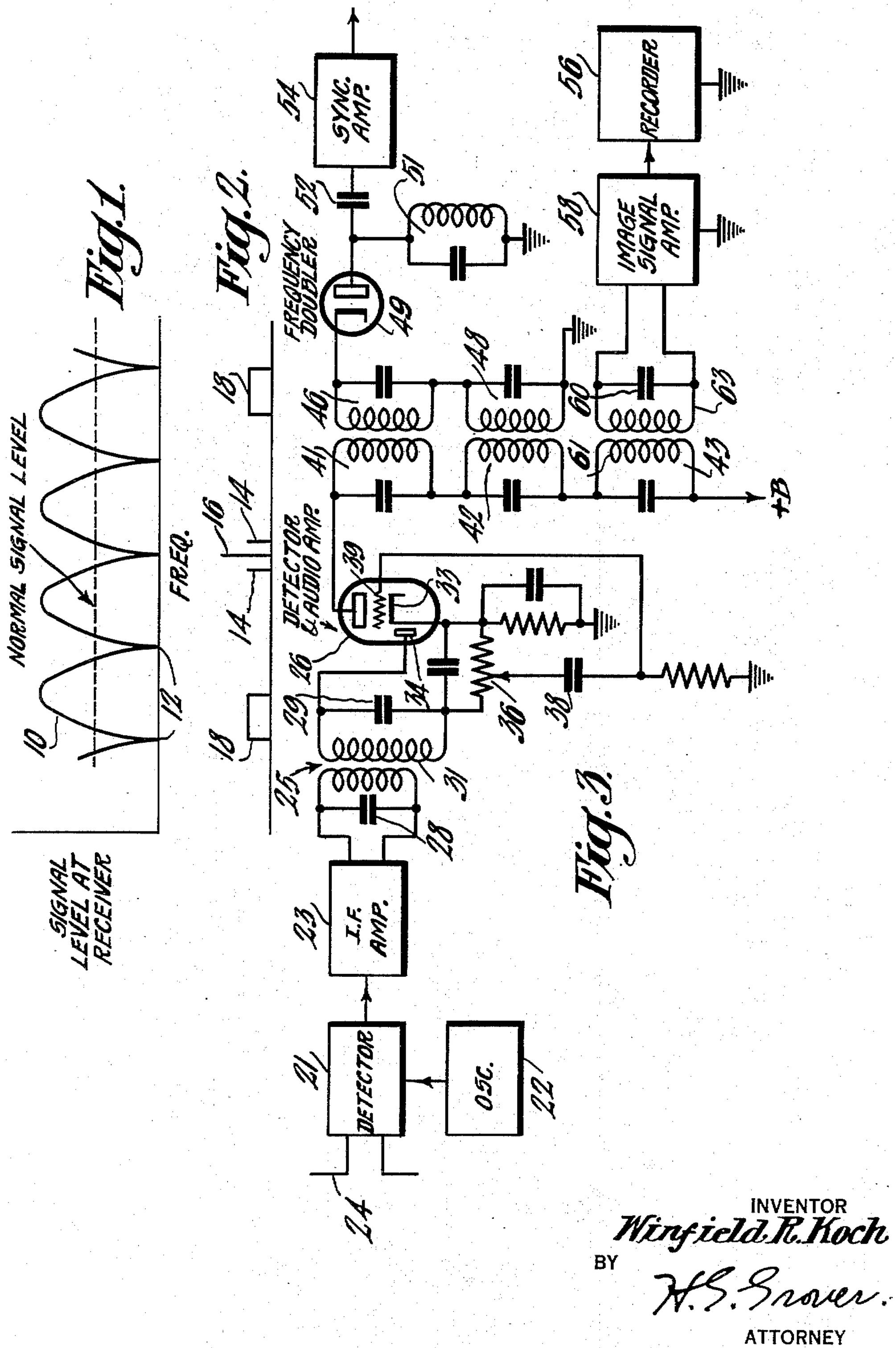
Fig. 2 shows the spectrum of a signal which is transmitted for reception in accordance with the invention.
Fig. 3 is a schematic diagram of a facsimile receiving system for producing recordings upon reception of the signal of Fig. 2.

Selective fading of radio signals can be represented as a modification of the signal spectrum by an amplitude vs. frequency curve 10 of Fig. 1. The points or regions 12 of maximum attenuation are approximately 2500 cycles apart in the United States in the presently assigned broadcast band. This corresponds to a difference in path length between direct and reflected waves of about 80 miles. As fading conditions change, the modifying curve, such as the curve 10 of Fig. 1, may shift back and forth over the signal spectrum or change its shape. When a facsimile reproducer is synchronized by a transmitted tone, selective fading may attenuate a carrier, leaving the tone side frequencies to beat with each other and thus produce only a second harmonic of the desired tone. When this selective fading changes somewhat, the reproducer may again synchronize but it may be out of frame and remain that way until manually adjusted. Frequency modulation of the tone is not of itself a preventative, for this also may be represented as a carrier and side-bands which may be selectively attenuated. As stated above, it is an important feature of the invention to confine the synchronizing portion of the signal to a band which is less than the frequency distance between points or regions 12. For example, the sync portion of the signal may be confined to a band less than 1500 cycles wide so that only part of the band can be attenuated at one time.

Fig. 2 of the drawing shows a frequency spectrum which may be transmitted in accordance with the invention where the sync side frequencies 14 are displaced 400 cycles from the carrier 16. At the receiver a derived 800 cycle tone is used for sync. The image signal components 18 are spaced from the carrier at a frequency difference which is greater than 400 cycles.

The receiver of Fig. 3 is arranged to synchronize by means (not shown) by an 800 cycle signal, and filters and a frequency doubler are used in the receiver so that if either side-frequency or the carrier fades out, the 800 cycle tone will be received continuously and loss of synchronization will be avoided. The receiver of Fig. 3 is of the superheterodyne type and comprises a first detector 21, an oscillator 22 and an intermediate frequency amplifier 23. The signal such as represented by Fig. 2 is applied to the antenna 24. A coupling transformer 25 couples the intermediate frequency amplifier 23 to a detector and audio amplifier stage which includes a diode-triode 26. The primary and secondary of the coupling transformer 25 are tuned by condensers 28 and 29 respectively so as to pass the intermediate frequency band which is amplified by the amplifier 23. The secondary 31 of the transformer 25 is connected to the cathode 33 and the diode anode 34 of the tube 26 in series with a potentiometer resistor 36. This resistor 36 serves as a volume control and the demodulated I. F. signals are applied by way of condenser 38 to the grid 39 of the tube 26. The triode portion of the tube 26 therefore will amplify the 400 cycle sync tone and the image signal frequencies lying in the frequency band 18 of Fig. 2. The triode portion of the tube 26 will amplify both the 400 cycle tone and the second harmonic of the 400 cycle tone, which may be present during selective fading. The plate circuit of this tube includes a filter in the form of resonant circuit 41 which is tuned to 400 cycles, a resonant circuit 42 tuned to 800 cycles and a resonant circuit 43 tuned to be responsive to frequencies lying within the image signal band 18. The resonant circuit 41 is coupled to a resonant circuit 46 while the resonant circuit 42 is coupled to a resonant circuit 48.

The diode rectifier 49 in conjunction with a tuned circuit 51 serves as a frequency doubler, the output thereof being fed by way of condenser 52 into a sync amplifier 54 which amplifies the recovered 800 cycle sync tone to be applied to synchronize a facsimile recorder 56. A suitable recorder operable in response to a facsimile image signal is shown in U. S. reissue Patent No. Re. 20,152 granted to C. J. Young on October 27, 1936. A synchronous motor (not shown) may be controlled by the derived tone in a well known manner.

The image signal frequencies selected by the resonant circuits 43 and 63 are transmitted to an image signal amplifier 58 from which they are fed to the recorder 56. The inductance 61 of the tuned circuit 43 serves as the primary of a coupling transformer, the secondary of which is tuned by a condenser 60. The degree of coupling between the coupled tuned circuits causes them to function as a band-pass coupling filter in a well known manner.

In operation of the receiver of Fig. 3, when the signal conditions are normal in the absence of selective fading, the 400 cycle sync tone is amplified by the triode section of the tube 26. This 400 cycle tone is selected by the parallel resonant circuit 41 and is transferred to the coupled resonant circuit 46. The frequency doubler diode 49 in conjunction with the tuned circuit 51 doubles this frequency and applies it to the sync amplifier 54. This frequency doubling will be caused by the non-linear relation of the current through the diode to the applied voltage. Other harmonics will, of course, be formed but the selectivity of circuit 51 is sufficient to select out only the second harmonic. When either of the synchronizing side frequencies fades, a 400 cycle tone is still present produced by the beating of the carrier with the remaining side frequencies. But when the carrier fades an 800 cycle tone is produced by the beating together of the two side frequencies. In this case, the harmonics produced by tube 49 will not be used, but a sufficient amount of the 800 cycle tone will be passed through the tube to circuit 51 and amplifier 54 to keep the recorder in synchronism. Thus loss of carrier or either side-frequency will not cause loss of synchronism.

Figures 4, 5, 6:
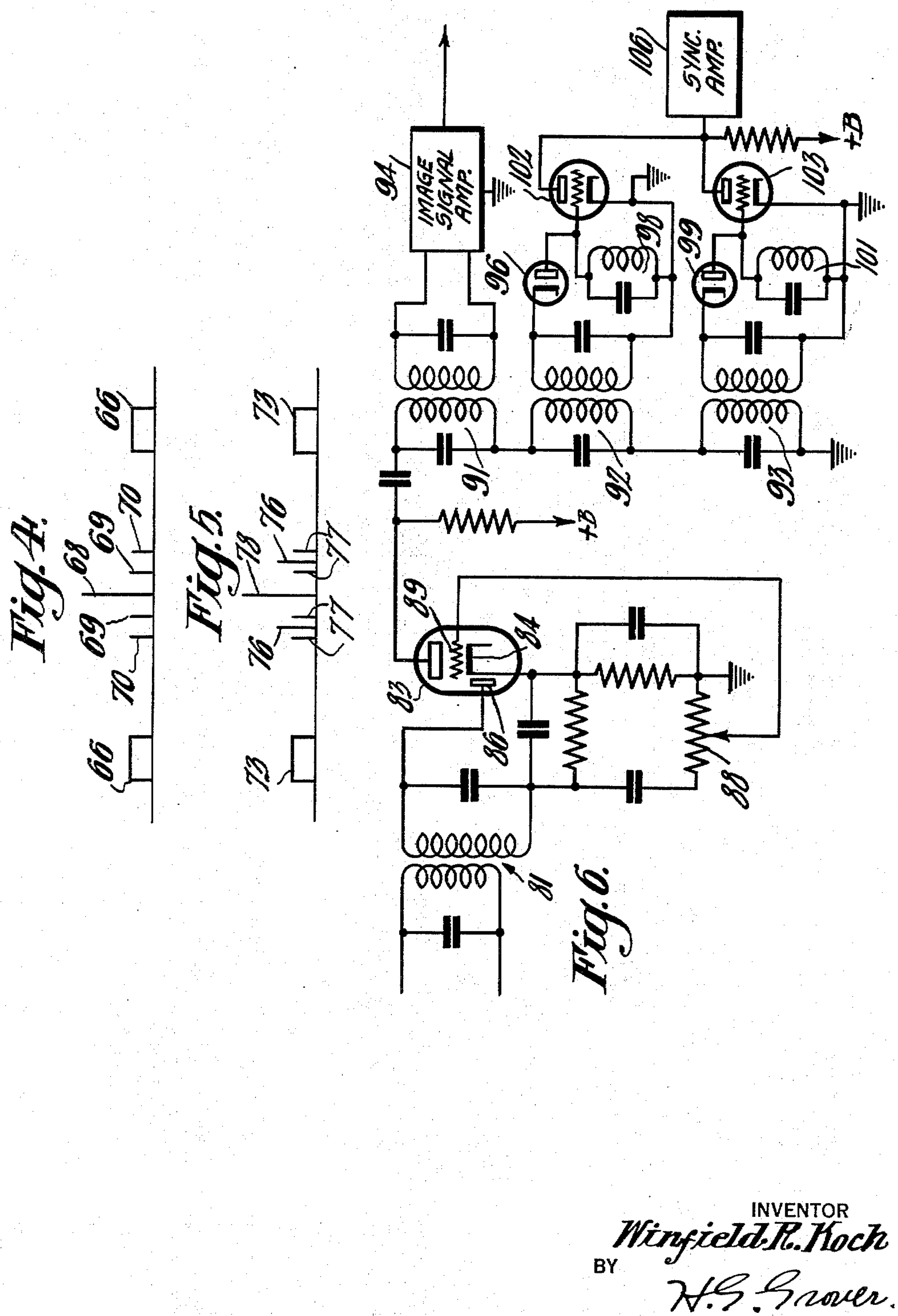
Fig. 4 is a signal spectrum produced in accordance with the invention for reception in accordance with the invention by the usual type of facsimile receiver.
Fig. 5 shows the spectrum of a modified signal which is transmitted for reception in accordance with the invention.
Fig. 6 is a schematic showing of a receiver for producing recordings from the signal of Fig. 5.

Fig. 4 of the drawing shows a frequency spectrum which may be transmitted in accordance with the invention for operating a recorder in the usual type of facsimile system which has no provision for avoiding the effects of selective fading and loss of synchronism. The image frequency side-bands 66 are disposed about the carrier 68 in the usual manner. The carrier is modulated simultaneously by 400 cycle and 800 cycle tones producing side-frequencies 69 and 70 respectively. This group of frequencies is less than 2500 cycles wide so that only one frequency will fade at a time upon the occurrence of selective fading. If any one of the side frequencies fades, the others will provide the 400 cycle tone for synchronization. If the carrier fades, the side frequencies beat together to give the 400 cycle tone.

Fig. 6 shows a receiver which operates in accordance with the invention when provided with a signal represented in Fig. 5. Referring to Fig. 5, the image side-bands 73 are substantially unchanged. The synchronizing tone is carried as an amplitude or frequency modulation of a higher tone. For example, the higher tone produces a side frequency 76 which is in effect a sub-carrier modulated to produce its own side tone 77. By way of example, the higher tone may be 500 cycles occupying the position in the spectrum represented at 76 and the side frequency of the carrier 76 may be 60 cycles indicated as side tones 77. If the carrier 76 fades the sub-tones 77 beat together to give a double frequency which is rectified to give the desired synchronizing tone. In the example assumed by way of illustration a 60 cycle tone is produced in this manner. If either sub-tone fades, the other will beat with the carrier to give the sub-tone which is rectified to produce the synchronizing tone.

Referring to Fig. 6 illustrating a receiver for the signal of Fig. 5, an I. F. transformer 81 corresponds to the I. F. transformer 25 of Fig. 3. A detector amplifier tube 83 is employed. The incoming I. F. signal is demodulated by being applied between the cathode 84 and the diode anode 86. A volume control potentiometer 88 is connected to supply the demodulated signal to the grid 89 of the tube 83. The amplified output of the tube 83 is applied across a series of filters in the form of tuned circuits 91, 92, and 93. The resonant circuit 91 is coupled to an image signal amplifier 94 which amplifies signals for a recorder. This recorder (not shown) may be similar to recorder 56 of Fig. 3. The resonant filter circuit 92 is tuned to twice the sub-tone frequency and the resonant circuit 93 is tuned to the sub-tone frequency. In the example given above, the frequency value of the sub-tone is 500 cycles; therefore the filter circuit 92 is tuned to 1,000 cycles and the filter circuit 93 is tuned to 500 cycles.

The filter circuit 92 is coupled to a circuit which includes a diode 96 and a tuned filter circuit 98. The latter is tuned to a frequency of the desired sync tone which in the foregoing example is 60 cycles. The filter circuit 93 is also coupled to a circuit which includes a diode 99 and filter circuit 101, the latter also being tuned to the desired sync tone. Amplifier tubes 102 and 103 combine the outputs from the filter circuits 92 and 93 so that they are applied to the input connection of a sync amplifier 106. The latter operates in any well known manner to synchronize the accompanying recorder.

Having now described the invention, what is claimed and desired to be secured by Letters Patent is the following:

A receiving system including synchronizing means for recording intelligence under control of sync signals, comprising a detector of intelligence signals and sync signals, tuned filters connected in series, means for supplying detected signals to said filters, means to utilize the output of one of said filters for recording intelligence, frequency doubling means, and means for supplying the output of a pair of said filters to said doubling means, and means for employing the output of said doubling means to operate said synchronizing means to synchronize the recording means.

WINFIELD R. KOCH.

REFERENCES CITED

The following references are of record in the file of this patent:

UNITED STATES PATENTS

| Number | Name | Date |
|---|---|---|
| 2,182,000 | Nichols | Dec. 5, 1939 |
| 2,212,968 | Finch | Aug. 27, 1940 |
| 2,256,529 | Seeley | Sept. 23, 1941 |
| 2,257,282 | Smith et al. | Sept. 30, 1941 |
| 2,258,943 | Bedford | Oct. 14, 1941 |
| 2,269,594 | Mathes | Jan. 13, 1942 |
| 2,335,180 | Goldsmith | Nov. 23, 1943 |
| 2,386,087 | Bingley et al. | Oct. 2, 1945 |